(12) United States Patent
Neirinck et al.

(10) Patent No.: US 8,025,838 B2
(45) Date of Patent: Sep. 27, 2011

(54) PROCESS FOR PRODUCING SINTERED POROUS MATERIALS

(75) Inventors: Bram Neirinck, Izegem (BE); Jozef Vleugels, Olen (BE); Jan Fransaer, Leefdaal (BE); Omer Van Der Biest, Herent (BE)

(73) Assignee: K.U. Leuven Research & Development (BE)

( * ) Notice: Subject to any disclaimer, the term of this patent is extended or adjusted under 35 U.S.C. 154(b) by 891 days.

(21) Appl. No.: 11/993,869

(22) PCT Filed: Jun. 27, 2006

(86) PCT No.: PCT/EP2006/006170
§ 371 (c)(1),
(2), (4) Date: Feb. 19, 2008

(87) PCT Pub. No.: WO2007/000310
PCT Pub. Date: Jan. 4, 2007

(65) Prior Publication Data
US 2009/0252635 A9    Oct. 8, 2009
US 2010/0074787 A2    Mar. 25, 2010
US 2010/0233009 A2    Sep. 16, 2010

(30) Foreign Application Priority Data
Jun. 27, 2005 (GB) .................................... 0512904.4
Dec. 23, 2005 (GB) .................................... 0526329.8

(51) Int. Cl.
*B22F 3/11* (2006.01)
*C04B 38/00* (2006.01)

(52) U.S. Cl. ............... 419/2; 419/40; 264/41; 264/46.4; 516/20; 516/22; 516/98; 516/100; 427/243; 427/246; 501/39; 501/80; 501/81

(58) Field of Classification Search .................... 264/41, 264/46.4; 516/20, 22, 98, 100; 427/243, 427/246; 501/39, 80, 81; 419/2, 40
See application file for complete search history.

(56) References Cited

U.S. PATENT DOCUMENTS

| 3,668,149 | A | * | 6/1972 | Geus et al. ........................ 502/74 |
| 5,223,033 | A | * | 6/1993 | King et al. ........................ 106/285 |
| 5,384,290 | A | * | 1/1995 | Brezny .............................. 501/81 |
| 5,645,891 | A | * | 7/1997 | Liu et al. ...................... 427/376.2 |
| 6,162,414 | A | | 12/2000 | Pinnavaia et al. |
| 6,872,675 | B2 | | 3/2005 | Imhof et al. |

(Continued)

FOREIGN PATENT DOCUMENTS
FR          2 852 947        10/2004
(Continued)

OTHER PUBLICATIONS

Binks, "Macroporous Silica from Solid-Stabilized Emulsion Templates," *Adv. Mater.* 14:1824-1827 (2002).

(Continued)

*Primary Examiner* — Roy King
*Assistant Examiner* — Ngoclan Mai
(74) *Attorney, Agent, or Firm* — Clark & Elbing LLP (57) ABSTRACT

The invention provides a process of making porous structures or materials, including the colloidal processing (e.g. slip casting, pressure casting, tape casting or electrophoretic deposition) of solid particle emulsions to form a green body that can be directly sintered without a de-binding step.

33 Claims, 6 Drawing Sheets

U.S. PATENT DOCUMENTS 7,147,819 B2    12/2006    Bram et al.

FOREIGN PATENT DOCUMENTS

| WO | WO 03/101647 A2 | 12/2003 |
| WO | WO 03/101647 A3 | 12/2003 |
| WO | WO 2004/087610 A2 | 10/2004 |
| WO | WO 2004/087610 A3 | 10/2004 |

OTHER PUBLICATIONS

Gove et al. (ed.), *Webster's Third New International Dictionary*, Merriam-Webster Inc., Springfield, MA (1993), p. 365.

Imhof and Pine, "Ordered Macroporous Materials by Emulsion Templating," *Nature* 389:948-951 (1997).

Imhof and Pine, "Uniform Macroporous Ceramics and Plastics by Emulsion Templating," *Chem. Eng. Technol.* 21:682-685 (1998).

Rice, *Ceramic Fabrication Technology*, Marcel Dekker, Inc., New York (2003), pp. 121-126 and 129-131.

Subramanian et al., "Macroporous Bulk Gels and Thin Films by Colloidal Templating of Emulsions and Latex Particles," *Mat. Res. Soc. Symp. Proc.* 628:CC11.13.1-CC11.13.6 (2000).

Yan et al., "A Chemical Synthesis of Periodic Macroporous NiO and Metallic Ni," *Adv. Mater.* 11:1003-1006 (1999).

Yi and Yang, "Microstructures of Porous Silica Prepared in Aqueous and Nonaqueous Emulsion Templates," *Chem. Mater.* 11:2322-2325 (1999).

Zhang and Cooper, "Synthesis and Applications of Emulsion-Templated Porous Materials," *Soft Matter* 1:107-113 (2005).

Zhang et al., "The Synthesis of Large Mesopores Alumina by Microemulsion Templating, Their Characterization and Properties as Catalyst Support," *Mater. Letters* 58:2872-2877 (2004).

International Search Report for PCT/EP2006/006170, mailed Sep. 14, 2006.

Written Opinion of the International Searching Authority for PCT/EP2006/006170, mailed Sep. 14, 2006.

Barsoum, "Fundamentals of Ceramics," McGraw-Hill, Singapore, pp. 2-4 and 6-10 (1997).

Callister, "Materials Science and Engineering: An Introduction," John Wiley & Sons, pp. 3, 4, and 377 (1994).

Davidge "Mechanical Behaviour of Ceramics," Cambridge University Press, Cambridge pp. 1-2 (1979).

Kingery, "Introduction to Ceramics," John Wiley & Sons, p. 3 (2004).

Neirinck et al., "Electrophoretic Deposition of Particle-Stabilized Emulsions," 30th International Conference on Advanced Ceramics and Composites, submitted Jan. 5, 2007.

Neirinck et al., "Production of Porous Materials Through Consolidation of Pickering Emulsions," *Advanced Engineering Materials* 9:57-59, 2007.

Neirinck et al., "Porous Titanium Coatings Obtained by Electrophoretic Deposition (EPD) of Pickering Emulsions and Microwave Sintering," *Advanced Engineering Materials* 10:246-249, 2008.

Neirinck et al., "Electrophoretic Deposition of Liquid Templates," *Key Engineering Materials* 412:299-305, 2009.

Neirinck et al., "A Novel Route to Produce Porous Ceramics," *Journal of the European Ceramic Society* 29:833-836, 2009.

Neirinck et al., "Preparation of Titanium Foams by Slip Casting of Particle Stabilized Emulsions," *Advanced Engineering Materials* 11:633-636, 2009.

Neirinck et al., "Slip Casting of Titanium and Titanium Hydride Stabilized Emulsions for the Production of Porous Bulk Titanium," Euro PM2009—PM Lightweight & Porous Materials II, 2009.

Neirinck, "Materials With Controlled Porosity," Katholieke Universiteit Leuven, Belgium, thesis presented May 2010, Chapters 1-5.

Neirinck, "Materials With Controlled Porosity," Katholieke Universiteit Leuven, Belgium, thesis presented May 2010, Chapters 6-8 and Appendices.

Neirinck et al., "Morphological Analysis of Slip-Cast Emulsion-Templated Alumina Foams by Microfocus Computer Tomography," *Journal of American Ceramic Society* 93:3921-3928, 2010.

* cited by examiner

PROCESS FOR PRODUCING SINTERED POROUS MATERIALS

CROSS-REFERENCE TO RELATED APPLICATIONS

This application is the U.S. National Stage of International Application No. PCT/EP2006/006170, filed Jun. 27, 2006, which claims the benefit of Great Britain Application Serial No. GB 0512904.4, filed Jun. 27, 2005, and Great Britain Application Serial No. GB 0526329.8, filed Dec. 23, 2005.

FIELD OF THE INVENTION

The present invention relates to an improved process for making sintered porous materials, especially ceramic or metallic sintered porous bodies. The present invention further relates to the sintered porous materials obtainable by such a process.

BACKGROUND OF THE INVENTION

Porous materials, metallic, ceramic and polymeric, have widespread applications. For different applications however different pore sizes and porosities are needed. A spherical pore geometry is often preferred since this offers better mechanical properties and offers a larger thermal shock resistance in high temperature applications. Production of these materials in a controlled manner is an important aspect of this technology. Some production methods in the art apply various colloidal processing routes comprising methods such as sacrificial materials, partial sintering and gas inclusion, as detailed below.

The technology will be explained with reference to a green body, i.e. a non-sintered material, in particular a non-sintered ceramic or metallic material. Green bodies have been for instance described in U.S. Pat. No. 6,596,799. A green body is a powder packing which has the ability to retain its shape. The green strength is the amount of force a green body can sustain before the shape retention is lost. Green bodies may be prepared from suspensions, pastes or dry powder of either ceramic powders, such as various kinds of ferrites, titanates, alumina, cordierite, titanium dioxide, silicon carbide, silicon nitride and the like, or metallic powders, such as steel, titanium and its alloys, aluminium and its alloys, by processes such as pressing of granules, slip casting and extrusion. Methods for obtaining manufacturing a ceramic or metallic green body for ceramic or metallic slurries containing a ceramic or metallic powder are well described in the art.

Sacrificial materials: a common route to obtain pores is the inclusion of an organic material into a green body. These organic materials can have almost any shape and/or size, and a multitude of such materials, including starch and polymers may be used. Mostly spherical particles are used since spherical pores offer obvious advantages in terms of mechanical and thermal shock properties. However, the organic material particles have to be removed for instance by burning out during a thermal step, called the de-binding step, before sintering can be done.

De-binding is a major step in the production of porous structures from metallurgic powders of the prior art. In common manufacturing processes of powder metallurgy, in order to facilitate ceramic powder to cast into bodies more easily, polymer materials are frequently added to the bodies as cast additives. Such type of cast additives includes adhesives, surfactants, fillings or lubricants. The cast additives are mixed with polymer materials for casting bodies that may be formed by methods such as moulding, forging, extrusion, injection or scraping. The formed bodies are generally placed into furnaces for de-binding (removal of the organic materials such as the casting polymers) as the next step. However, the cast additives used come as high as 30% by volume, and defects incurred are prone to arise during removal of the polymer materials in the de-binding process. De-binding processes currently used include solvent de-binding and thermal de-binding, as follows:

a) Solvent de-binding is implemented by the steps of dipping a body into a solvent, and extracting dissolvable adhesives, fillings, surfactants or lubricants from the body for forming successive openings penetrating from an interior to an exterior of a sample. Thus, subsequent heating is able to facilitate exsudation of residual adhesive in form of a gas or a liquid through the openings. In addition, de-binding efficiency is increased while decreasing defects by pressurising the solvent to a supercritical state or heating the solvent into steams. However, such means of solvent de-binding brings forth environmental and recycling issues and thus further increases processing expenses thereof.

Thermal de-binding is implemented by the steps of placing a body into a furnace, and removing adhesives directly or after solvent de-binding. Only human-friendly gases that give no environmental, recycling or human-hazardous issues like those in solvent de-binding are produced, and therefore thermal de-binding is the most extensively applied de-binding process. Nevertheless, it is necessary to pre-heat the furnace to a temperature required for thermal de-binding, meaning that time and energy for pre-heating and energy consumed during maintaining heat are costly, and an efficiency problem often abstained by the manufacturing process is resulted. Also, defects are prone to occur during the time-consuming thermal de-binding process.

This de-binding step is crucial since all organic materials are gasified and have to leave the green body through the small pores between the particles. If the amount of organic materials is high, and/or if the substrate is thick, the de-binding process will be very long, thus raising the production cost of the final products. The green body can also be damaged or even completely destroyed if gasification of the organic material during this de-binding step occurs at a too high rate or speed. Any damages in the green body will remain after sintering, thus lowering the strength of the final product. Additional problems such as, but not limited to, cracks caused by a differential thermal expansion of the matrix materials and the sacrificial materials have been reported as well. The de-binding step usually takes place at temperatures of about 200° C. to 500° C. Thermal expansion takes place when the green body is heated up to this de-binding temperature. Since different materials have different thermal expansion coefficients, stresses occur in the green body during this initial thermal cycle. These stresses can in turn cause cracks. The high temperature at which de-binding takes place also causes this technique to be useless for some applications. Catalysts e.g. for fuel cells can be destroyed or deactivated at these temperatures and some materials such as glasses start to sinter below the relevant de-binding temperature. In this situation there is a need for other methods for the production of porous materials.

Instead of spherical particles, an organic foam can be used as well as a template for the production of porous materials. This template is covered with the particles by passing a slurry through it. However the same de-binding problems exist for this production route and the control over the pore geometry is far less extensive than for other sacrificial materials. Moreover the struts of the final material are typically hollow when sponge templates are used.

A last drawback of the sacrificial materials technique is the cost of typical sacrificial materials such as, but not limited to, polymethylmethacrylate, polystyrene, starch and ammonium bicarbonate.

Partial sintering: the green body obtainable from a colloidal processing step can be sintered partially. A green body is in essence a powder packing with the ability to retain its shape. Consolidation of the solid form happens during sintering in which the individual particles are connected due to solid state diffusion. The material can be sintered to full density, meaning that all boundaries of all particles make contact with their immediate neighbours. The material can also be sintered to a lower density, in which case pores between particles will remain in the sintered end product. These pores have a random shape, and their size will depend on the extent of sintering and the particle size. If large or very large pores are needed, bigger particles have to be used. Bigger particles however have a detrimental effect on the global strength of the resulting material, since the largest grain determines the strength of a sintered piece if no other critical defects are present. The larger the grains, the lower the fracture strength. Furthermore the remaining pores usually have a random shape with some sharp edges which facilitate crack formation and growth, lowering the fracture strength even more. The inherent incomplete sintering aggravates this loss in strength even further. Porous particles or aggregates of porous particles can be used instead of individual solid particles to obtain the green body prior to sintering, e.g. in the production of porous hydroxyapatite.

Gas inclusion: by electrophoretic deposition, green bodies can be formed due to the application of an electric field. When aqueous media are used and high voltages are applied, electrolysis of water occurs. Thus the use of hydrogen and oxygen bubbles as a possible route for the production of porous materials has already been reported. When gas bubbles evolve at the deposition electrode they can be incorporated in the deposit, thus causing the formation of spherical pores. The voltage used offers some, but very limited, control over the size and amount of the bubbles formed. However a too high gas evolution hampers the electrophoretic deposition system due to a loss in effective electrode surface. Gas evolution may also cause premature loosening of the deposit from the electrode, or cause cracks in the green body.

Sol gel processing is a non-colloidal processing route that uses the gellation of ceramic precursors to form objects. These ceramic precursors may be organometallic compounds such as metal alkoxides which gel when exposed to water. The formed gel can subsequently be submitted to calcination and then sintered in order to consolidate the object. Since the gelled structure mainly consists of organic material and solvents, the calcination step must be performed with great care. The shrinkage of the structure during this step is substantial and the final product is usually only a fraction of the size of the initial gel structure. The use of emulsion droplets from a non aqueous emulsion has also been described as a method to obtain pores in a gelled structure, for instance in perovskite ceramic materials. These pores are retained after calcination and sintering. In a similar manner, hollow particles can be produced by coating emulsion droplets with a ceramic precursor gel followed by calcination. The major objections to sol gel processing are the high cost of the ceramic precursors and the troublesome calcination step. Shrinkage during the calcinations step complicates the prediction of the final dimensions, and handling of the gelled structure prior to consolidation can prove troublesome as well.

Polymerisation: ceramic objects can also be produced by incorporating ceramic particles into a polymer matrix, either by mixing a molten polymer with ceramic particles or by polymerising a suspension of ceramic particles in a monomer or pre-polymer. The resulting solid structure consists purely of polymer and ceramic particles. The polymer has then to be removed during a de-binding step. Afterwards the resulting ceramic particles can be sintered to consolidate the final product. If an emulsion of monomer and an other liquid is used, then a porous polymer ceramic composite can be obtained, the pores being retained during de-binding and sintering. The de-binding of the polymer matrix is the crucial step in this type of ceramic processing. The substantial amount of polymer causes this to be a slow process. Damages due to fast gasification also can occur. Thick objects are therefore difficult to obtain using this process. Furthermore substantial shrinkage occurs during this step, thus complicating the prediction of the final dimensions.

Polymer addition/stabilisation: in a similar fashion emulsions that are stabilized by a polymer binder matrix can be used as pore formers. For instance the use of polyvinyl alcohol for the preparation of porous high frequency single crystal capacitors has been described. Although the polymer content is usually lower than with a polymer matrix generated through polymerisation, the same problems remain.

Thus, there is a need in the art for an efficient process for the formation of porous materials, which reduces the risk of damages such as crack formation in the materials and/or which improves the cost effectiveness of the process.

SUMMARY OF THE INVENTION

The present invention relates to a system and method for producing ceramic and metallic sintered porous bodies, wherein said method includes a colloidal processing step (e.g. involving a method such as, but not limited to, slip casting, pressure casting, tape casting, dip coating or electrophoretic deposition) of solid ceramic or metallic particle emulsions, preferably solid ceramic or metallic particle stabilised emulsions. After subsequent sintering, the structure obtainable from this process results in porous solids such as macro-, micro- or mesoporous matrices, glasses, amorphous (non-crystalline) solids, para-crystalline solids or crystalline solids with improved properties. The process of the present invention directly provides sintered porous bodies, i.e. without a de-binding step.

The present invention solves the problems of the prior art techniques by means of a process for forming green bodies from solid particle emulsions and further sintering said green bodies to achieve a solid porous structure or material without a de-binding step in the manufacturing process. The present invention has unexpectedly found that no additional de-binding step is needed before sintering to remove any material used to obtain the pores in the green body in a process for making sintered porous materials or solid porous materials.

In accordance with the purpose of the invention, as embodied and broadly described herein, the invention uses solid particle stabilised emulsions in colloidal processing routes in order to obtain pores, preferably spherical pores, in the green body and further comprises sintering the green body in order to obtain a porous material.

DETAILED DESCRIPTION OF THE INVENTION

In a first aspect, the invention comprises a process for producing a porous ceramic body from a green body, characterised in that first a solid particle stabilised solid particle emulsion is made of a combination of at least two immiscible liquids and solid particles wherein the solid particles form a layer on or are densely packed on the interface of the immiscible fluids and further colloidal processing of solid particle stabilised emulsions to form the green body and further sintering of the green body without a de-binding step.

More specifically, the present invention relates to a process for producing a porous ceramic or metallic body from a ceramic or metallic green body, said process comprising the steps of:

making a stabilised solid particle emulsion from a combination of at least two immiscible liquids, and solid ceramic or metallic particles, wherein said solid ceramic or metallic particles form a layer onto or are densely packed at the interface of said at least two immiscible fluids, colloidal processing of solid particle stabilised emulsion to form a ceramic or metallic green body, and directly sintering said ceramic or metallic green body.

In one aspect of the present invention, "directly sintering" means that there is no need for a de-binding step after the colloidal processing step.

In one aspect of the present invention, the size as well as the amount of the pores can efficiently be controlled in the porous solids obtained after the direct sintering step. Another advantageous aspect of the present invention is the type of porosity, open or closed, that can be chosen due to this controlling possibility.

The solid particle stabilised emulsions present in the initial step of the process of this invention are obtainable with any combination of at least two immiscible liquids, and any type of powder particle, in particular ceramic particle, that can be subjected to a sintering process. A wide range of effects is obtainable by modification of the powder particle surface. The rheologic behavior and polarity properties of the at least two liquids can be adjusted to provide similar effects.

Most, if not all, metals powders are suitable for performing the process of the present invention. This is especially true for pure metals without contamination. Many non-metallic substances such as glass, alumina, silica, magnesia, lime, ferric oxide, and various organic polymers are also suitable for the process of present invention.

The method of the present invention is also particularly suitable to produce macro-porous, micro-porous or meso-porous amorphous silica, alumina, titania, zirconia, titanium or stainless steel.

Particularly suitable are metals such as, but not limited to, titanium, copper, zinc, cobalt, magnesium and metal alloys such as, but not limited to, steel, stainless steel, titanium alloys, bronze, brass, Ti—V—Al alloys, Ti—V—Zr alloys, Ti—V—Zr—Nb alloys, Al—CU alloys and Cr—V alloys. Also suitable are:

oxides such as, but not limited to, $Al_2O_3$, $ZrO_2$, $TiO_2$, HfO, MgO, ZnO, BaTiO3, SrTiO3, CaTiO2, CaO, Y2O, CeO2, Fe2O3, FeO, SiO2, borides such as, but not limited to, $TiB_2$, $ZrB_2$, $B_4C$, $AlB_2$, HfB2, VB2, bB2, TaB2, CrB2, Mo2B5 or W2B5, nitrides such as, but not limited to, ZrN, TiN, $Si_3N_4$, HfN, NbN, VN, TaN, AlN, Si2N4, BN or SiAlON, carbides such as, but not limited to, SiC, TiC, ZrC, HfC, VC, NbC, CaC, Cr3C2, Mo2C, WC, V2C, Nb2C, Ta2C, B4C, fluorides, glasses like pyrex (or borosilicate glass), potassium borosilicate, Li2Si2O5, Oxy fluoride glass ceramics, such as, but not limited to, [Al2O3, MgO, CaO, SiO2 glass], [PbO, SiO2 glass], [B2O3, SiO2, Na2O glass], [MgO, Al2O3, SiO2 glass] or [CaSiO3, CaMgSi2O6, CaAl2Si2O8 glass], phosphates e.g. calcium phosphate, hydroxyapatite, LaPO4 or CePO4, and sinterable thermoplastic polymers such as, but not limited to, polyethylene-imine, polystyrene, polymethylmethacrylate, polyethylene and polytetrafluoroethylene.

Any combination or composite of the materials mentioned above can be used for the performance of this invention.

An embodiment of present invention involves a process for producing a porous ceramic body comprising the steps of making a solid particle emulsion; colloidal processing of solid particle emulsions to form a green starting body and sintering the material after the colloidal processing step. This solid particle emulsion can be a stabilised solid particle emulsions and the solid particles form a layer on the interface of two immiscible fluids. The green body can be formed by a colloidal process such as slip casting, pressure casting, tape casting, dip coating or electrophoretic deposition.

In a particular embodiment of present invention the solid particle emulsion comprise a ceramic powder. This ceramic powder can be selected from the group consisting of silicon carbide, silicon nitride, titanium diboride and aluminium nitride.

In yet another embodiment of the present invention, the solid particle emulsion comprises a metal oxide powder, preferably a metal oxide powder selected from the group consisting of alumina, magnesia, titania, nickel oxide and iron oxide.

The volume percent porosity in the green body or in the sintered body can be predetermined for instance by modifying the ratio of the powder volume in the continuous phase to the volume of the emulsified liquids in the process. In a particular embodiment the porosity of the sintered body produced by the process of present invention is in the range of from 1 to 99%, preferably in the range from 10 to 90% and most preferably from 20 to 80%.

The main pore size in the porous body can be controlled, depending on the powder particle size, within a range from about 5 mm to about 50 nm, preferably within the range from 1 mm to 100 nm and most preferably from 500 μm to 500 nm, by controlling the ratio of powder volume used to stabilise the emulsion and the total volume of the emulsified liquids.

By means of the process of the present invention, various types of porous amorphous structures, porous para-crystalline materials, macro-porous materials, micro-porous materials, or meso-porous materials can be obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed. It will be apparent to those skilled in the art that various modifications and variations can be made in process of the present invention of formation of porous materials from solid particle emulsions and in construction of the system and method without departing from the scope or spirit of the invention.

Solid particle stabilization of emulsions are obtainable by solid particles in the interface of immiscible fluids, especially when those particles are densely packed. Particles can act as the stabilizing agent by wetting by the two phases, the oil and the aqueous phase, the affinity to each of the two phases should being different, in which case a stable interfacial film with good protection against coalescence can be achieved. Such solid particle stabilized emulsion may be formulated as surfactant-free emulsions.

Sintering is a term describing a method for making objects from powder, increasing the adhesion between particles as they are heated. It is particularly used with ceramic powders and in powder metallurgy. Sintering is know in the art a method for making objects from powder, increasing the adhesion between particles as they are heated to form a strong cohesive body. Sintering traditionally serves for manufacturing ceramic objects, and has also found use in such fields as powder metallurgy. Sintering relates to diffusion. It is know as a process of forming objects from a metal powder by heating the powder at a temperature below its melting point. In the production of small metal objects it is often not practical to cast them. Through chemical or mechanical procedures a fine powder of the metal can be produced. When the powder is compacted into the desired shape and heated, i.e., sintered, for up to three hours, the particles composing the powder join together to form a single solid object.

Slip Casting is a process route in which the suspensions are poured into a porous plaster or polymer mould that drains the fluid from the emulsion due to capillary forces. The mould is often discarded after the process. This method can be used to produce both monolithic objects, hollow objects and thin wall objects. There is no size limitation and the technique is suitable for mass production.

Pressure Casting can be regarded as an evolved and highly industrialized form of slip casting. Instead of the disposable plaster moulds, porous polymer moulds are used for multiple production cycles. In order to speed up the process an additional pressure is exerted during casting. This pressure can be either a vacuum over the mould or an overpressure over the slurry. Both systems can be combined. The results are similar to those produced in slip casting.

Tape Casting is a technique where a thin film of a suspension is spread on a casting surface. After drying this thin film is removed from this surface for further treatment. Tape casting results in thin strips of materials that can be flexible in their green state due to the amount of binder and plasticizer present. These thin tapes often find applications in the production of electronic devices, filtering and membrane technology, and can be stacked for the processing of multilayer.

Electrophoretic Deposition is a technique where a suspension of charged particles is placed between two electrodes. When an electric field is created in the suspension by applying a voltage difference across the electrodes the particles move towards one electrode depending on their charge. When the particles reach the electrode a deposit is formed on the electrode. This can either be a thin film or a thick deposit, which retains the shape of the electrode. Electrophoretic deposition offers the possibility to produce simple objects, both hollow and monolithic, and the possibility to coat conducting surfaces. Using this technique, graded materials can be obtained, both in material composition as in porosity and/or pore size.

Dip Coating is a technique used to coat all types of surfaces simply by dipping an object into a colloidal slurry. After drying a thin film of material ready for further processing remains on the surface.

The term "sol" as used in this application is in the meaning of a colloid that has a continuous liquid phase in which a solid with particle size in the micrometer range or smaller is suspended. It can mean a colloidal solution, colloidal suspension.

The term "amorphous" or "amorphous structure" as used herein means without apparent long range order of the atom positions; it can also be interpreted as non-crystallised or lacking crystallinity.

Paracrystalline materials such as the transitional alumina also have a wide distribution of pore sizes, but better defined X-ray diffraction patterns usually consisting of a few broad peaks.

The term "microporous material" as used herein is in the meaning of solids that contain pores with free diameters of molecular dimensions. The upper limit of the micropore diameter range according to IUPAC is 2 nm.

The term "mesoporous material" as used herein is in the meaning of solids that contain pores with free diameters of 2-50 nm.

The term "macroporous material" as used herein is in the meaning of solids that contain pores with free diameters above 50 nm.

Table 1 includes the IUPAC classification of porous materials:

| Dominant pore width (nm) | Type of material |
|---|---|
| <2 | microporous |
| 2-50 | mesoporous |
| >50 | macroporous |

The expression "bio-inert" as used herein is in the meaning of having no direct interaction with biological systems.

In sharp contrast to these structurally ill-defined solids are materials whose pore size distribution is very narrow because it is controlled by the precisely repeating crystalline nature of the materials, microstructure. These materials are called "molecular sieves", the most important examples of which are zeolites. Zeolites, both natural and synthetic, have been demonstrated in the past to have catalytic properties for various types of hydrocarbon conversion. Certain zeolitic materials are ordered, porous crystalline alumino-silicates having a definite crystalline structure as determined by X-ray diffraction, within which there are a large number of smaller cavities which may be interconnected by a number of still smaller channels or pores. These cavities and pores are uniform in size within a specific zeolite material. Such molecular sieves, both natural and synthetic, include a wide variety of positive ion-containing crystalline silicates. These silicates can be described as a rigid three-dimensional framework of $SiO4$ and Periodic Table Group IIIB element oxide, e.g. $AlO4$, in which tetrahedra are crosslinked by the sharing of oxygen atoms whereby the ratio of the total Group IIIB and Group IVB, e.g. silicon, atoms to oxygen atoms is 1:2.

Generally, porous substances are divided by pore size, for example, pore sizes smaller than 2 nm classified as microporous substances, between 2 and 50 nm classified as mesoporous substances and larger than 50 nm classified as macroporous substances. Of the porous substances, those having uniform channel, such as zeolite, are defined as molecular sieves and up to hundreds of types of zeolites have been found and synthesised thus far. Zeolites play an important role as catalysts or carriers in modern chemical industries by virtue of their characteristics including selective adsorption, acidity and ion exchangeability. However, the molecular size of a reactant which can be utilized in catalyst conversion reactions, etc. is limited by the pore size of zeolite because zeolite is a microporous molecular sieve.

The present invention uses solid particle emulsions, preferably solid particle stabilized emulsions, to produce a green body, which is consequently sintered or partially sintered in a controllable manner to fuse the ceramic or metallic particles together to a controllable degree to obtain a solid porous structure.

The solid particle emulsions are obtainable by mixing at least two immiscible liquids to which solid particles or grains are added. When two immiscible liquids are brought together, an interphase area will be formed. By stirring the liquids, droplets are created increasing the interphase surface area. This is however an energetically unfavourable situation and the two phases will separate again when mixing is stopped. The droplets however can be partially or fully stabilised in the continuous phase by solid particles located at this interphase. This is often referred to as Pickering emulsions. The solid particles locate themselves at the interphase because of the difference in surface tension of the two liquids. Once located at this interphase the particle will remain there in a stable state. If enough particles are present, a hexagonal close packing (HCP) of solid particles can be achieved at the interphase. In this way, emulsion droplets can be stabilised with solid particles located at the interphase. The amount and the size of the globules can be controlled by the amount of solid material added or the volume of emulsified liquid.

In the present invention, the solid emulsions, preferably solid stabilized emulsions, are used in colloidal processing routes in order to produce a green body that by sintering is transformed in solid porous materials with controlled spherical porosity and with a controlled pore size. In addition to the extended control over the process, no de-binding step is required prior to sintering since all liquids can be removed for instance by capillary extraction or by evaporation before the sintering step. Any combination of two or more immiscible liquids as well as any type of sinterable powder material can be processed in this route. Most, if not all, metal powders can be sintered. This is especially true of pure metals produced without surface contamination. Moreover, many non-metallic powders also sinter, such as glass, alumina, silica, magnesia, lime, beryllia, ferric oxide, and various organic polymers. A great range of material properties can be obtained by sintering with subsequent reworking. Physical characteristics of various products can be altered by changing density, alloying, or heat treatments. These materials are suitable for the process of present invention.

A particular embodiment of the present invention is that the pore size in the sintered porous materials is controllable. In order to control the pore size, the ratio of the amount of powder used to stabilise the droplets and the volume of emulsified liquid can be used to determine the parameter for the size of the stabilised droplets, and the eventual pores in the green body. Thus by either altering the amount of stabilising powder or the volume of emulsified liquid, one can control the actual pore size. The minimal droplet size largely depends on the size of the particles and the used emulsifying technique. The maximum pore size is a function of the droplet stability, which depends on the combination of liquids, the powder surface chemistry, the powder particle size and the solid loading. Once the droplets are formed and are stable, the stirring can be decreased or ceased. In an alternative embodiment the droplets can be additionally stabilised by adding a small amount of binder. In yet another embodiment of the present invention the viscosity of the emulsified droplets is rheologically altered to improve the strength and stability of the droplets. Stabilisation expands the range of possible production conditions in which the emulsions can be used. Some production routes, such as tape casting, preferably involve the presence of binders and plasticizers to provide green strength and plasticity to the green tape.

Figure 1:
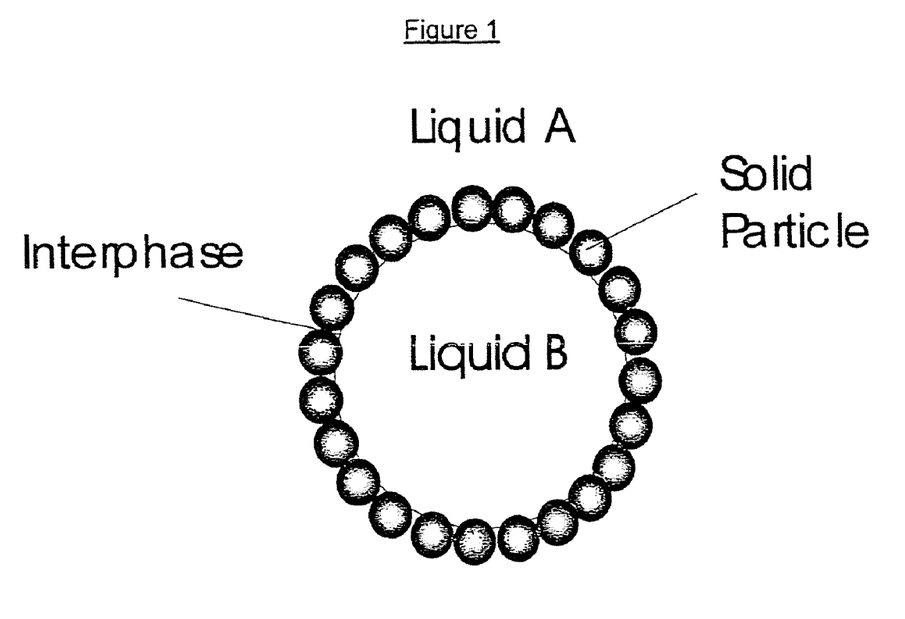
FIG. 1 is a schematic view showing solid particle stabilised emulsion droplet.

Another particular embodiment of the present invention involves the control of porosity in the sintered porous materials. A porous material in essence is comprised of 2 phases. The voids in the material are the first phase and the matrix material between those pores is the second phase. The amount of matrix material can be controlled by the amount of powder that is added to the emulsion after the droplets are stable. This additional powder can be mixed into the continuous phase (liquid A in FIG. 1) of the emulsion by gentle stirring. The mixing energy has to be limited below the level that would otherwise cause the droplets to be broken up into smaller droplets. Controlling the amount of the matrix materials also controls the amount of voids in a certain volume, and the global distance in-between the voids. If the amount of matrix material is increased sufficiently, the pores will be separated and a closed porosity structure will be obtained.

Alternatively the present invention also involves a particular colloidal processing method. The products obtained with colloidal processing routes can be subdivided into two major classes: free standing objects and coatings. Each route has its own specific product range, and each type of product has its own application range. The applications stated here are specific for porous materials. However it is impossible to state all processing routes in which the emulsions can be used, and all the applications for which the obtained porous materials can be used.

The methods of present invention to manufacture porous structures that are suitable for various applications such as Scaffolds; Insulating materials for both high (refractory materials) and low temperatures; Fluid separation technologies, Chromatographic columns, Filters for both high and low temperature (cfr. molten metals) fluids, Membranes for chemical applications such as Materials for impregnation with e.g. metals or lubricants; catalyst supports; Fuel cells; Laminates; Sooth filters; Foams; ion exchangers; Catalysts; Adsorbents; Microelectronics; Photonics; Drug delivery; Medical diagnosis; Seedling stem cells to encourage bone growth around implants, Implants of porous materials that facilitate tissue in-growth thereby improving long-term implant retention and reducing the rate of extrusion; Porous materials for dental implants; Porous materials to increase friction on moving parts, Porous materials as carriers for substances to improve the dissolution rate by solid dispersion of that substance, Porous materials to enhance the efficiency of combustion systems and to reduce the emission of pollutants; Porous materials to alter heat transfer characteristics, etc. . . .

A particular embodiment of present invention involves the coating of substrates with the porous material of the present invention. The coating can be achieved by electrophoretic deposition of the green material from the solid particle emulsions, preferably stabilised solid particle emulsions, on a substrate. This is obtainable by for instance electrophoretic deposition or by dip coating. Electrophoretic Deposition is widely used to produce coatings on electrically conducting surfaces. Such porous coatings are particularly suitable for biomedical applications. Alternatively methods such as dip coating can be used to coat all types of surfaces simply by dipping an object into the colloidal slurry. The specific application for instance biomedical coatings, surface enlarging coatings (catalytic surfaces), thermal barrier coatings or laminates (fracture deflection areas) determines the material that is to be used.

There are various applications for the porous materials that are obtainable by the process of present invention. Ceramics with controlled porosity find wide applications as catalytic surfaces and supports, adsorbents, chromatographic materials, filters, light weight materials, and thermal and acoustic insulators. In catalytic applications the macropores facilitate material transport to the nanoporous internal regions where reactions can take place. Macroporous silica could be of substantial use as insulating layers in integrated circuits. The low dielectric constant of this material lowers the capacity of the chips which makes them faster. Furthermore, ceramics with regular arrays of pores have unique optical properties such as optical filters which have strong wavelength dependent reflectivity and transmission. They are also candidates for photonic band gap materials. Macroporous ceramics are known in the art to be useful for various applications such biocompatible materials. For instance macroporous calcium phosphate ceramics have been described to be used as biocompatible material for bone surgery and osseo-integration of macroporous calcium phosphate ceramics; macroporous ceramics [e.g. tricalcium phosphate] are suitable used for the production of scaffolds for tissue-engineered bone using mesenchymal stem cells and a Biodegradable Scaffold.

Example 1

Electrophoretic Deposition of Porous Objects

Figure 2:
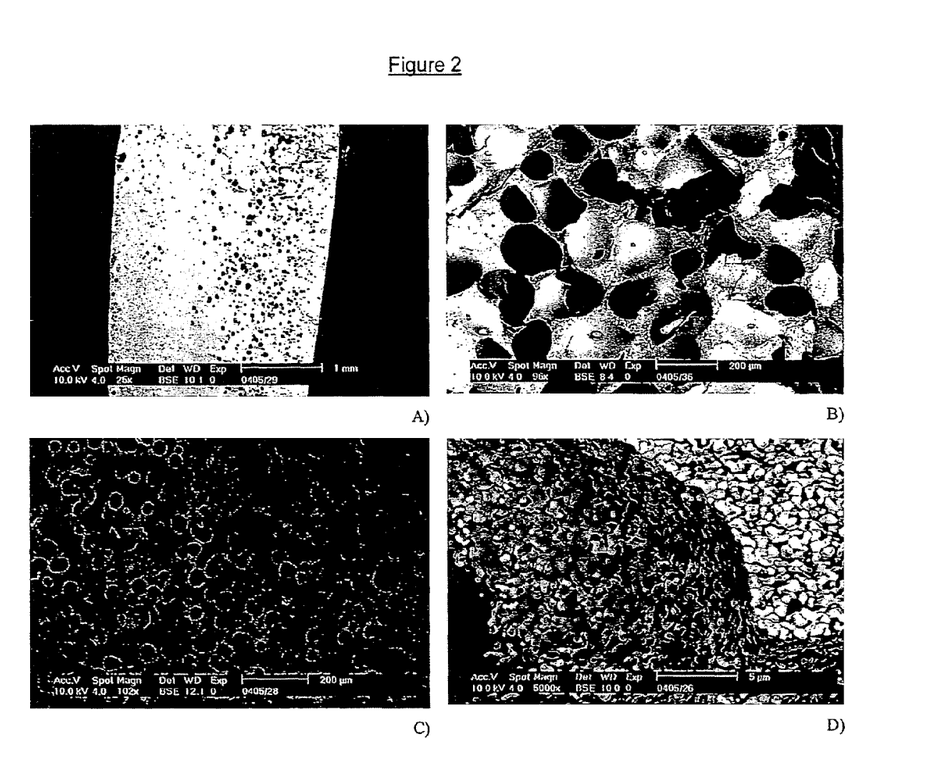
FIG. 2 shows scanning electron microscopy (hereinafter referred as SEM) pictures of the fracture surfaces of porous $Al_2O_3$ materials produced by electrophoretic deposition as follows: (A) Graded porosity 45% porosity with pores of about 70 μm, (B) 76% porosity with pores of about 200 μm, (C) 33% porosity with pores of about 50 μm, and (D) magnified image of pore wall.

FIG. 2 shows some examples that illustrate the potential of the method of present invention. These examples were produced using an ethanol/paraffin oil emulsion system in which 60 nm $\gamma$-$Al_2O_3$ particles (CR125, Baikowski) were used for stabilising the droplets and creating the matrix. The green bodies were produced by electrophoretic deposition and sintered for half an hour at 1550° C. FIG. 2-A shows a graded material obtained by differential deposition of the emulsion droplets, FIG. 2-B shows a macro porous material with extremely large open pores and very high porosity, FIG. 2-C depicts a less porous material bordering between open and closed porosity and FIG. 2-D clearly shows that the matrix has been sintered close to full density, and that the pore walls are actually very smooth, which is ideal for the mechanical and thermal shock properties.

Prior to the preparation of the actual emulsion, alumina was suspended in ethanol by magnetically stirring the powder in ethanol with the charging agent in a glass container for one hour. Subsequently, the suspension was placed in an ultrasonic bath (Branson 2510) for 15 minutes. Finally the actual emulsion was prepared by adding a volume of paraffin liquid to a measure ethanol and by vigorously stirring it using a mechanical stirrer (IKA RW20n) equipped with a standard 4-blade impeller. This emulsion was stabilized by adding an amount of the previously prepared suspension (stabilizing suspension) and mixed for an additional 5 minutes. The obtained solid stabilized emulsion was kept in motion by gently stirring it on a magnetic plate. Another volume of alumina suspension (bulk suspension) was added before starting the electrophoretic deposition experiment. The compositions used are stated in Table 2 below.

TABLE 2

| Exp. | Emulsion | | Stabilizing powder | | | Bulk powder | | |
| --- | --- | --- | --- | --- | --- | --- | --- | --- |
| | $V_{ethanol}$ [ml] | $V_{paraffin}$ [ml] | $V_{ethanol}$ [ml] | $m_{powder}$ [g] | $V_{HNO3\ 0.1N}$ [ml] | $V_{ethanol}$ [ml] | $m_{powder}$ [g] | $V_{HNO3\ 0.1N}$ [ml] |
| A | 25 | 50 | 50 | 10 | 1.5 | 50 | 10 | 1.5 |
| B | 25 | 75 | 50 | 15 | 2.25 | 25 | 5 | 0.75 |
| C | 25 | 25 | 50 | 20 | 3 | 50 | 10 | 1.5 |
| D | 25 | 25 | 50 | 10 | 1.5 | 50 | 10 | 1.5 |

Figure 6:
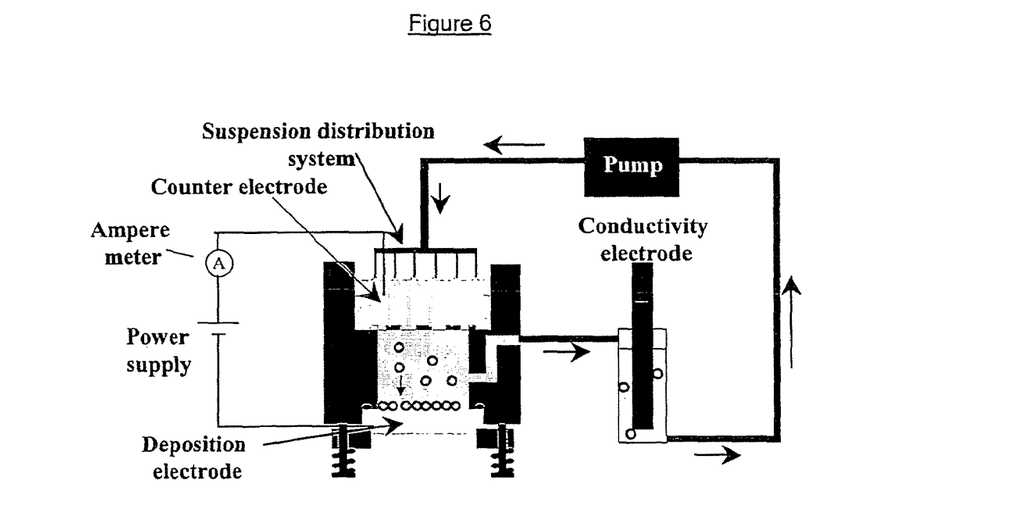
FIG. 6 shows the experimental electrophoretic cell used in example 1.

The electrophoretic deposition experiments were carried out in the experimental setup of FIG. 6, comprising a flow-through horizontal deposition cell and an emulsion circulation system driven by a peristaltic pump. The total volume of emulsion used in this system was 150 ml. The deposited discs have a diameter of 37.5 mm and the distance between the two electrodes is 35 mm.

The deposition was performed at a constant voltage of 300 V for 900 seconds using a F.U.G. (type M CN 1400-50) power supply. The deposition process was monitored by recording the cell current (Onron, K3NX). The conductivity of the suspension was measured using a conductivity electrode (WTW, Cond Level) placed outside the deposition cell in order to prevent interference of the electrical field.

The resulting deposits were subsequently dried (2 hours in a vacuum chamber) and sintered in air until sufficient densification had occurred (20 minutes at 1550° C. with a initial heating rate of 20° C./minute up till 1100° C., a final heating rate of 10° C./minute and a cooling rate of 25° C./minute). The remaining pores in the deposits after sintering are investigated by means of scanning electron microscopy (XL 30 FEG device commercially available from FEI, The Netherlands). The density of the sintered pieces was measured by the Archimedes method with ethanol as solvent. A lacquer with known density was used to seal the pores before submerging the pieces.

The graded structure illustrated in FIG. 2-A is the result of the difference of deposition speed between the droplets and the individual particles. If suspensions or emulsions of low concentration are used in electrophoretic deposition the particles and droplets will deposit at a rate that depends on their electrophoretic mobility. The result is a graded structure in which the slower droplets deposits later than the individual particles. With some effort the obtained gradient can be controlled. If more concentrated suspensions are used the faster moving particles will drag the slower moving particles and droplets along and a homogeneous result is obtained.

An alternative way to obtained graded structures, both in the amount of pores, or the pore size is to adjust the emulsion composition of the process liquid during processing. This can be obtained either by adding emulsion of different composition, or by adding powder or emulsified liquid. Sequential deposition of different emulsions can be used to obtain similar results, or to produce laminates.

Example 2

Slip Casting

Figure 3:
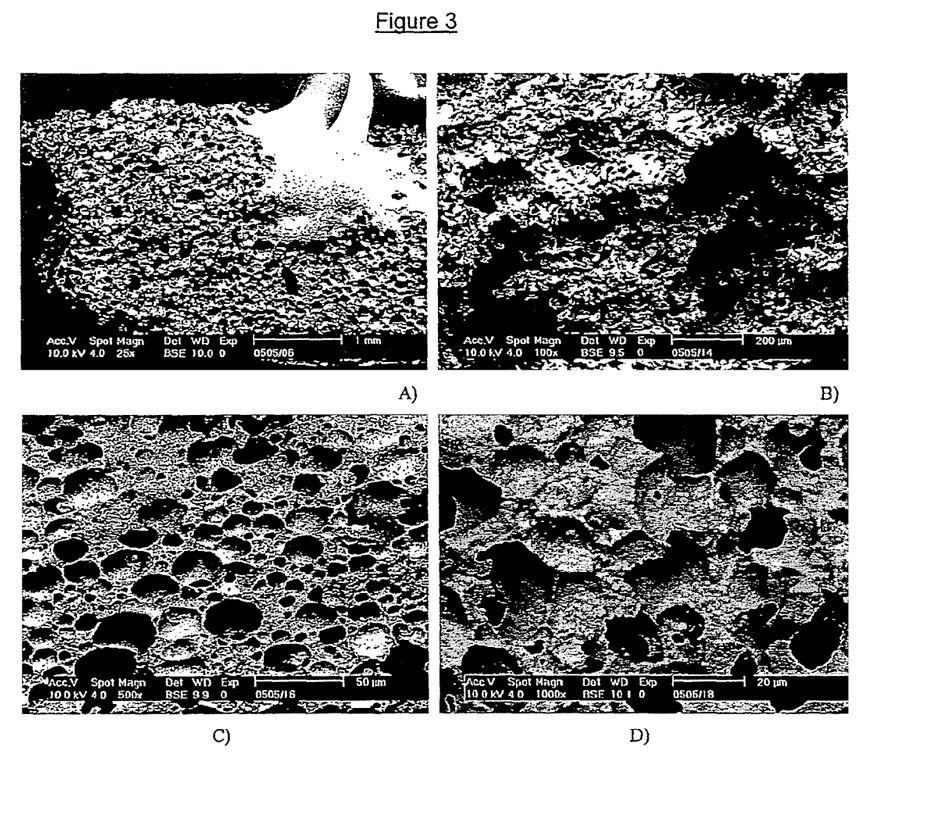
FIG. 3 shows SEM pictures of the fracture surfaces of porous materials produced by Slip casting: (A) Yttria stabilised $ZrO_2$ 87% porosity with pores in the range of 200 to 50 μm, (B) Titanium 56% porosity with pores of about 200 μm, (C) $Al_2O_3$ 63% porosity with pores in the range of 30 to 3 μm, and (D) Ceria stabilised $ZrO_2$ 50% porosity with pores of about 10 μm.
Figure 4:
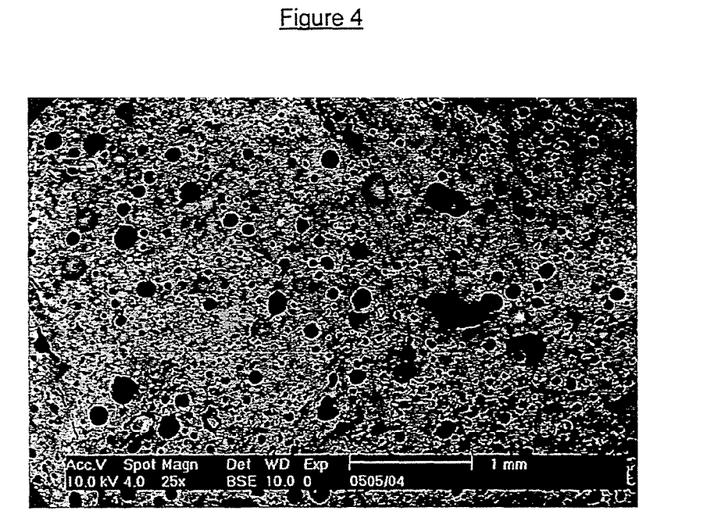
FIG. 4 shows an SEM picture of the fracture surface of a Pyrex glass with 18% porosity with pores in the range of about 10 to 100 μm.

The slip casting set-up used herein consists of a plaster plate on which a Teflon or glass ring was placed. In order to ensure easy removal of the green product, a filter paper was placed in-between the ring and the plate. A wider range of materials was tried in these experiments. This includes several types of alumina ($\gamma$-$Al_2O_3$ CR125 & $\alpha$-$Al_2O_3$ SM8, from Baikowski), zirconia (Yttria stabilised zirconia HSY-3U & Ceria stabilised zirconia CEZ12, from Daiichi), Pyrex glass (Corning 7740), stainless steel (316L, 5 μm particles) and titanium (Ti, HCST, from Amperit). The green bodies of each material were sintered at the specific conditions required. Results are shown in FIGS. 3 and 4. Due to the more difficult mixing in the highly concentrated slurries used for slip casting, not all produced materials have a narrow pore size distribution. Both A) and C) show a relative wide distribution. The use of higher energy mixing methods can ameliorate this. The titanium shown in B) was not sintered to full density between the pores. A slightly longer sintering cycle will solve this problem. The zirconia used in D) did however sinter to full density in-between the pores as shown in the SEM photograph. However B) and D) clearly show that adjacent pores open up during sintering due to sintering stresses acting in on the thin pore wall resulting in open porosity.

For these experiments the following procedure was used: In advance plaster plates, diameter 45 mm and 5 mm thick, of chemically pure plaster were prepared. These were calcined for 1 hour at 800° C. prior to slip casting. Meanwhile the emulsions were prepared. A simplified preparation route was followed due to the small amount of emulsion needed in these preliminary tests. First the emulsion was prepared by magnetically mixing the paraffin (Nujol mull, Acros) and demineralised water. Directly to this the dry powder was added. In order to reduce viscosity and improve the breakdown of agglomerates, a base was added as a charging additive. This was left to stir magnetically for 30 minutes. The full composition is stated in Table 3 below.

TABLE 3

| Exp. | Powder class | Type and manufacturer | $m_{powder}$ [g] | $V_{H2O}$ [ml] | $V_{paraffin}$ [ml] | Charging additive | $V_{add}$ [ml] |
|---|---|---|---|---|---|---|---|
| A | Yttria stabilized $ZrO_2$ | HSY-3U Daiichi | 20 | 5 | 10 | NaOH 0.1N | 5 |
| B | Titanium | HOST Amperit | 20 | 13 | 5 | Butylamine | 3 |
| C | $Al_2O_3$ | SM8 Baikowski | 20 | 7.5 | 10 | Butylamine | 6 |
| D | Ceria stabilized $ZrO_2$ | CEZ12 Daiichi | 20 | 7.5 | 10 | Butylamine | 9 |
| E | Pyrex Glass | Corning 7740 | 25 | 10 | 10 | NaOH 0.1N | 2 |

Additional to these some binder was added to recipes B, C and D after the preparation of the emulsion as follows:

- 0.10 g Dolapix CE64 (from Zschimmer & Scharz) was added to recipe B;
- to C and D respectively 0.5 and 0.3 g of JP502 (from Johoku Chemical) was added.

The actual slip casting was performed shortly after the calcination of the plaster plate. On top of the plate a filter paper (mn615 diameter 90 mm, Macherey-Nagel) was placed to facilitate the removal of the final piece from the plaster. On top of this paper a glass (diameter 37.5 mm, 10 mm high) or Teflon (diameter 40 mm, 15 mm high) was placed. In this cup emulsion was poured. After all the fluids were drained from the emulsions the resulting green structures were processed in the same manner as described under the electrophoretic deposition experiments of example 1. They were additionally dried in a vacuum chamber for 2 hours before sintering. The zirconia and alumina samples were then sintered using the same cycle as the alumina structures obtained by EPD. The titanium was sintered in a reducing atmosphere (argon gas with 10% $H_2$) for 1 hour at 1350° C.

Example 3

Pressure Casting

Green objects were successfully made using a vacuum filtration set-up very similar to the simplest form of industrial pressure casting. The materials used include alumina ($\gamma$-$Al_2O_3$ CR125 & $\alpha$-$Al_2O_3$ SM8, from Baikowski), zirconia (Ytria stabilized zirconia HSY-3U & Ceria stabilised zirconia CEZ12, from Daiichi), Pyrex glass (Corning 7740), stainless steel (316L, 90%<5 µm) and titanium (Ti, HCST from Amperit, <60 µm). The sintered discs have a similar appearance to those obtained by slip casting and electrophoretic deposition.

The emulsions for these experiments were prepared in the same manner as those used in the slip casting experiments of example 2. These emulsions were then filtered in a vacuum filter set-up in order to create the green structures. The pore size of the used filter paper was chosen with regard to the used particle size. Finally the consolidated products are obtained from the green plates using the same procedure as for the slip casted pieces.

Example 4

Tape Casting

Figure 5:
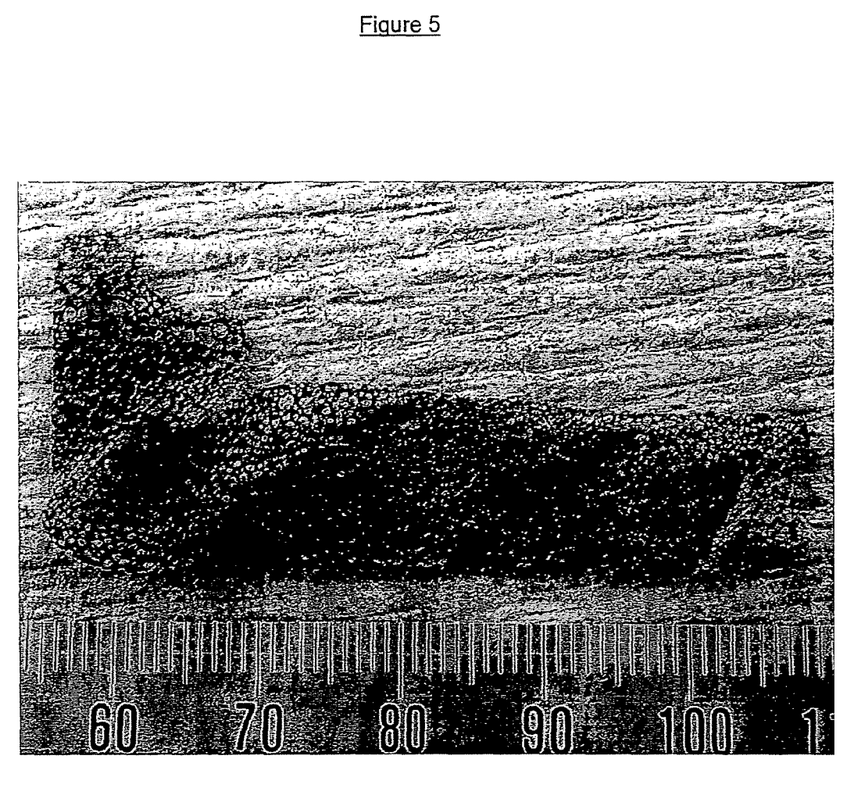
FIG. 5 displays a porous titanium film produced by tape casting of a solid stabilized emulsion.

The solid particle stabilized emulsion route of this invention can be in a tape casting procedure. Emulsion comprising 50 g titanium (HCST from Amperit), 50 ml paraffin oil (Nujol mull, from Acros), 50 ml ethanol (technical grade from Marchem), 3 ml butylamine (99% pure, from Acros) 3 ml of a JP502 binder (from Johoku chemical) and 5 g polyvinylbutyral (from Acros) prepared by sequentially mixing everything together magnetically and poured on a polypropylene substrate resulted in a typical flexible thin sheet of green material, of which a titanium example is shown in FIG. 5.

Example 5

Dip Coating

It has been noticed that thin films of porous material tend to stick to the glass and metal equipment used during the tests of examples 1 to 4. When binders are added, even polytetrafluoroethylene objects were subject to coating. This already illustrates that most surfaces can be dip coated by the particle stabilised emulsions made according to the present invention.

Example 6

Electrophoretic Deposition of Coatings

Figure 7:
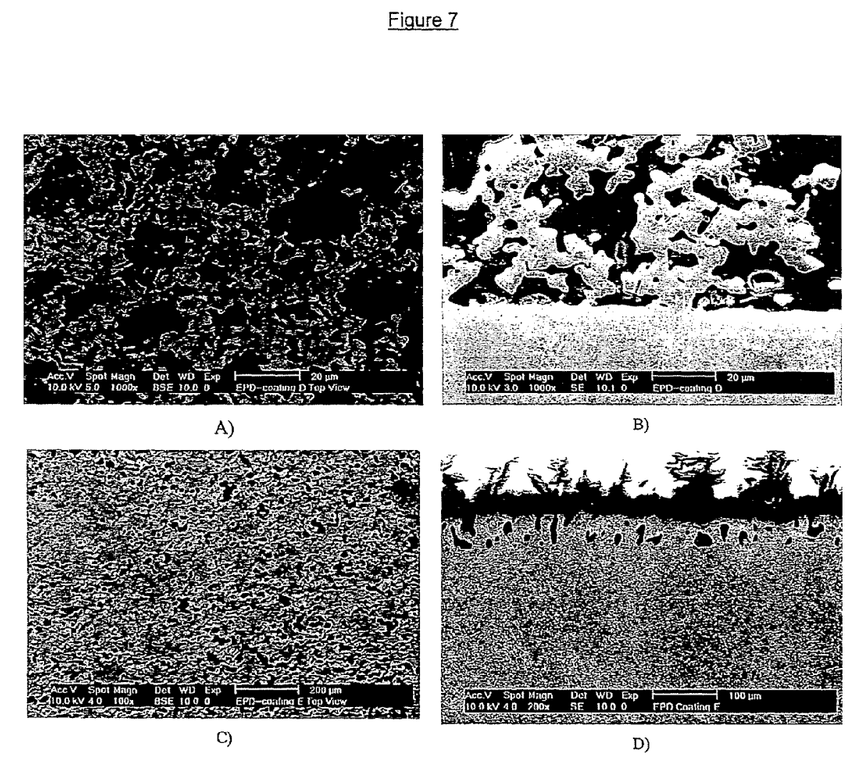
FIG. 7 shows SEM pictures of porous titanium coatings produced by electrophoretic deposition.

FIG. 7 shows some top views and cross sections of porous titanium coatings produced by electrophoretic deposition. For these coatings 95% pure titanium powder with a mean particle size of 1-3 µm was used in an ethanol/paraffin oil emulsion system. The emulsions described in table 4 were prepared by magnetically stirring all the ingredients in a beaker for 1 hour, followed by ultra-sonication for an additional 15 minutes.

TABLE 4

| Exp. | Powder class | Type and manufacturer | $m_{powder}$ [g] | $V_{EtOH}$ [ml] | $V_{paraffin}$ [ml] | Charging additive | $V_{add}$ [g] |
|---|---|---|---|---|---|---|---|
| A | Titanium | T8-10005-P Testbourne Ltd. | 20 | 60 | 20 | Dolapix CE64 | 0.1 |
| C | Titanium | T8-10005-P Testbourne Ltd. | 20 | 75 | 25 | — | — |

In experiment A, 0.10 g Dolapix CE64 (from Zschimmer & Scharz) was added to improve the surface charge of the powder.

The coatings were produced on bullet shaped Ti6Al4V substrates using electrophoretic deposition. The deposition parameters were 600 V and 30 seconds for experiment A, and 100 V and 600 seconds for experiment D. After deposition, the coatings were dried and sintered in vacuum for 2 hours. The coating of experiment A was sintered at 1000° C., and coating of experiment C was sintered at 1200° C. The more elevated temperature used for sintering sample C caused mass diffusion of aluminium and vanadium from the substrate to the coating, thus resulting in an altered microstructure of the coating.

TABLE 1

| Pure metals & elements | Alloys | Oxides | Borides | Carbides | Nitrides | Fluorides | Glasses | Phosphates | Polymers | Minerals |
|---|---|---|---|---|---|---|---|---|---|---|
| Li | Pd | Steels | $Al_2O_3$ | $TiB_2$ | TiC | TiN | $AlF_3$ | Borosilicate | Calcium phosphate | PMMA | Diamond |
| Be | Ag | Stainless Steels | $ZrO_2$ | $ZrB_2$ | HfC | ZrN | CF | Potassium Borosilicate | Hydroxyapatite | PTFE | Kaolin |
| Na | Cd | Bronze | HfO | $HfB_2$ | ZrC | HfN | $MgF_2$ | $Al_2O_3$, MgO, CaO, $SiO_2$ | $LaPO_4$ | PE | Lava |
| Mg | Nb | Brass | MgO | $VB_2$ | VC | NbN | LiF | PbO, $SiO_2$ | $CePO_4$ | PP | Steatite |
| Al | Rh | Ti—V—Al alloys | $TiO_2$ | $NbB_2$ | NbC | VN | | $B_2O_3$, $SiO_2$, $Na_2O$ | | PC | Cordiriete |
| Ca | Ba | Ti—V—Zr alloys | ZnO | $TaB_2$ | CaC | TaN | | MgO, $Al_2O_3$, $SiO_2$ | | PS | Clays |
| Ti | Ta | Ti—V—Zr—Nb alloys | $BaTiO_2$ | $CrB_2$ | $Cr_3C_2$ | AlN | | $CaSiO_3$, $CaMgSi_2O_6$, $CaAl_2Si_2O_8$ | | PVA | Bentonite |
| V | W | Al—CU alloys | $SrTiO_3$ | $Mo_2B_5$ | SiC | $Si_3N_4$ | | $Li_2Si_2O_5$ | | PVC | Pyrophyllit |
| Cr | Ir | Cr—V alloys | $CaTiO_2$ | $W_2B_5$ | $Mo_2C$ | BN | | Oxy fluoride glass ceramics | | PSU | Talc |
| Mn | Pt | Ni-alloys | CaO | | WC | SiAlON | | | | PEEK | Feldspar |
| Fe | Au | Zn-alloys | $Y_2O$ | | $V_2C$ | | | | | POM | Wollastonit |
| Co | Pb | Al-alloys | $CeO_2$ | | $Nb_2C$ | | | | | PVDF | Spodumen |
| Ni | Bi | Cu-alloys | $Fe_2O_3$ | | $Ta_2C$ | | | | | | Potter's flint |
| Cu | C | Mg-alloys | FeO | | $B_4C$ | | | | | | Dolomite |
| Zn | Si | Ti-alloys | $SiO_2$ | | | | | | | | Bauxite |
| Rb | U | Ag-alloys | Ferrites silicates | | | | | | | | Kyanite |
| Mo | | Au-alloys | | | | | | | | | Nepheline syenite |

The invention claimed is:

1. A process for producing a macroporous ceramic or metallic, free-standing object or coating, comprising the steps of:
    making a solid particle stabilised emulsion from a combination of at least two immiscible fluids, and solid ceramic or metallic particles, wherein said solid ceramic or metallic particles are selected from the group consisting of: titanium, copper, zinc, cobalt, magnesium, steel, stainless steel, titanium alloys, bronze, brass, Ti—V—Al alloys, Ti—V—Zr alloys, Ti—V—Zr—Nb alloys, Al—Cu alloys, Cr—V alloys, $Al_2O_3$, $ZrO_2$, $TiO_2$, HfO, MgO, ZnO, $BaTiO_2$, $SrTiO_3$, $CaTiO_2$, CaO, $Y_2O$, $CeO_2$, $Fe_2O_3$, FeO, NiO, $TiB_2$, $ZrB_2$, $B_4C$ $AlB_2$, $HfB_2$, $VB_2$, $TaB_2$, $CrB_2$, $Mo_2B_5$, $W_2B_5$, ZrN, TiN, $Si_3N_4$, HfN, NbN, VN, TaN, AlN, BN, SiAlON, SiC, TiC, ZrC, HfC, VC, NbC, CaC, $Cr_3C_2$, $Mo_2C$, WC, $V_2C$, $Nb_2C$ $Ta_2C$, fluorides, borosilicate glass, potassium borosilicate, $Li_2Si_2O_5$, oxyfluoride glass ceramics, calcium phosphate, hydroxyapatite, $LaPO_4$, $CePO_4$ and combinations thereof, and wherein said solid ceramic or metallic particles form a layer onto or are densely packed at the interface of said at least two immiscible fluids,
    colloidal processing of solid particle stabilised emulsion to form a ceramic or metallic green body or coating, and
    directly sintering said ceramic or metallic green body or coating without a de-binding step.

2. The process of claim 1, wherein the solid particle stabilised emulsion is surfactant-free.

3. The process of claim 1, wherein all said solid ceramic or metallic particles have the same composition.

4. The process of claim 1, wherein said solid ceramic or metallic particles comprise particles having different compositions.

5. A process for producing a macroporous ceramic or metallic, free-standing object or coating, comprising the steps of:
    making a solid particle stabilized emulsion from a combination of at least two immiscible fluids, and solid ceramic or metallic particles, wherein said solid ceramic or metallic particles are selected from the group consisting of: titanium, copper, zinc, cobalt, magnesium, steel, stainless steel, titanium alloys, bronze, brass, Ti—V—Al alloys, Ti—V—Zr alloys, Ti—V—Zr—Nb alloys, Al—Cu alloys, Cr—V alloys, $Al_2O_3$, $ZrO_2$, $TiO_2$, HfO, MgO, ZnO, $BaTiO_2$, $SrTiO_3$, $CaTiO_2$, CaO, $Y_2O$, $CeO_2$, $Fe_2O_3$, FeO, NiO, $TiB_2$, $ZrB_2$, $B_4C$ $AlB_2$, $HfB_2$, $VB_2$, $TaB_2$, $CrB_2$, $Mo_2B_5$, $W_2B_5$, ZrN, TiN, $Si_3N_4$, HfN, NbN, VN, TaN, AlN, BN, SiAlON, SiC, TiC, ZrC, HfC, VC, NbC, CaC, $Cr_3C_2$, $Mo_2C$, WC, $V_2C$, $Nb_2C$ $Ta_2C$, fluorides, borosilicate glass, potassium borosilicate, $Li_2Si_2O_5$, oxyfluoride glass ceramics, calcium phosphate, hydroxyapatite, $LaPO_4$, $CePO_4$ and combinations thereof, and wherein said solid ceramic or metallic particles form a layer onto or are densely packed at the interface of said at least two immiscible fluids,
    colloidal processing of the solid particle stabilized emulsion to form a ceramic or metallic green body or coating, wherein said colloidal processing involves a method selected from the group consisting of slip casting, pressure casting, tape casting, electrophoretic deposition and dip coating, and
    directly sintering said ceramic or metallic green body or coating without a de-binding step.

6. The process of claim 1, wherein the solid particle stabilised emulsion comprises a ceramic powder.

7. The process of claim 2, wherein said surfactant-free solid particle stabilised emulsion comprises a ceramic powder selected from the group consisting of silicon carbide, silicon nitride, titanium diboride, and aluminium nitride.

8. The process of claim 1, wherein said stabilised solid particle emulsion comprises a metal oxide powder selected from the group consisting of alumina, magnesia, titania, nickel oxide and iron oxide.

9. The process of claim 1, wherein the green body or coating formed after the colloidal processing step has a volume porosity in the range of from 1 to 95 percent.

10. The process of claim 1, wherein the resulting sintered body or coating has a volume porosity in the range of from 1 to 95 percent.

11. The process of claim 2, wherein all said solid ceramic or metallic particles have the same composition.

12. The process of claim 2, wherein said solid ceramic or metallic particles comprise particles having different compositions.

13. The process of claim 5, wherein the solid particle stabilized emulsion is surfactant-free.

14. The process of claim 2, wherein the solid particle stabilised emulsion comprises a ceramic powder.

15. A process for producing a macroporous ceramic or metallic, free-standing object or coating, comprising the steps of:
making a solid particle stabilized emulsion from a combination of at least two immiscible fluids, and solid ceramic or metallic particles, wherein said solid ceramic or metallic particles are selected from the group consisting of: titanium, copper, zinc, cobalt, magnesium, steel, stainless steel, titanium alloys, bronze, brass, Ti—V—Al alloys, Ti—V—Zr alloys, Ti—V—Zr—Nb alloys, Al—Cu alloys, Cr—V alloys, $Al_2O_3$, $ZrO_2$, $TiO_2$, HfO, MgO, ZnO, $BaTiO_2$, $SrTiO_3$, $CaTiO_2$, CaO, $Y_2O$, $CeO_2$, $Fe_2O_3$, FeO, NiO, $TiB_2$, $ZrB_2$, $B_4C$, $AlB_2$, $HfB_2$, $VB_2$, $TaB_2$, $CrB_2$, $Mo_2B_5$, $W_2B_5$, ZrN, TiN, $Si_3N_4$, HfN, NbN, VN, TaN, AlN, BN, SiAlON, SiC, TiC, ZrC, HfC, VC, NbC, CaC, $Cr_3C_2$, $Mo_2C$, WC, $V_2C$, $Nb_2C$ $Ta_2C$, fluorides, borosilicate glass, potassium borosilicate, $Li_2Si_2O_5$, oxyfluoride glass ceramics, calcium phosphate, hydroxyapatite, $LaPO_4$, $CePO_4$ and combinations thereof, and wherein said solid ceramic or metallic particles form a layer onto or are densely packed at the interface of said at least two immiscible fluids,
colloidal processing of solid particle stabilized emulsion to form a ceramic or metallic green body or coating, and
directly sintering said ceramic or metallic green body or coating without a de-binding step,
wherein said solid particle stabilised emulsion is surfactant-free and comprises a ceramic powder selected from the group consisting of silicon carbide, silicon nitride, titanium diboride, and aluminium nitride.

16. The process of claim 2, wherein said stabilised solid particle emulsion comprises a metal oxide powder selected from the group consisting of alumina, magnesia, titania, nickel oxide and iron oxide.

17. The process of claim 2, wherein the green body formed after the colloidal processing step has a volume porosity in the range of from 1 to 95 percent.

18. The process of claim 2, wherein the resulting sintered body has a volume porosity in the range of from 1 to 95 percent.

19. The process of claim 5, wherein all said solid ceramic or metallic particles have the same composition.

20. The process of claim 5, wherein said solid ceramic or metallic particles comprise particles having different compositions.

21. The process of claim 13, wherein all said solid ceramic or metallic particles have the same composition.

22. The process of claim 13, wherein said solid ceramic or metallic particles comprise particles having different compositions.

23. The process of claim 15, wherein all said solid ceramic or metallic particles have the same composition.

24. The process of claim 15, wherein said solid ceramic or metallic particles comprise particles having different compositions.

25. The process of claim 5, wherein said stabilized solid particle emulsion comprises a metal oxide powder selected from the group consisting of alumina, magnesia, titania, nickel oxide and iron oxide.

26. The process of claim 5, wherein the green body formed after the colloidal processing step has a volume porosity in the range of from 1 to 95 percent.

27. The process of claim 5, wherein the resulting sintered body has a volume porosity in the range of from 1 to 95 percent.

28. The process of claim 13, wherein said stabilized solid particle emulsion comprises a metal oxide powder selected from the group consisting of alumina, magnesia, titania, nickel oxide and iron oxide.

29. The process of claim 13, wherein the green body formed after the colloidal processing step has a volume porosity in the range of from 1 to 95 percent.

30. The process of claim 13, wherein the resulting sintered body has a volume porosity in the range of from 1 to 95 percent.

31. The process of claim 15, wherein said stabilized solid particle emulsion comprises a metal oxide powder selected from the group consisting of alumina, magnesia, titania, nickel oxide and iron oxide.

32. The process of claim 15, wherein the green body formed after the colloidal processing step has a volume porosity in the range of from 1 to 95 percent.

33. The process of claim 15, wherein the resulting sintered body has a volume porosity in the range of from 1 to 95 percent.

* * * * *

UNITED STATES PATENT AND TRADEMARK OFFICE
CERTIFICATE OF CORRECTION

| | | |
|---|---|---|
| PATENT NO. | : 8,025,838 B2 | Page 1 of 1 |
| APPLICATION NO. | : 11/993869 | |
| DATED | : September 27, 2011 | |
| INVENTOR(S) | : Neirinck et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this
Sixth Day of March, 2012

David J. Kappos
*Director of the United States Patent and Trademark Office*